United States Patent [19]

Carveth

[11] Patent Number: 4,629,080
[45] Date of Patent: Dec. 16, 1986

[54] CONTAINER SUCH AS A NURSING CONTAINER, HAVING FORMED ENCLOSURE CHAMBER FOR A DISPENSING MEMBER

[75] Inventor: Peter C. Carveth, Glen Ellyn, Ill.

[73] Assignee: Baxter Travenol Laboratories, Inc., Deerfield, Ill.

[21] Appl. No.: 599,303

[22] Filed: Apr. 12, 1984

[51] Int. Cl.$^4$ .......................... A61J 9/00; A61J 9/06; A61J 9/08; B65D 33/36

[52] U.S. Cl. .................. 215/11 R; 215/11 C; 215/11 E; 206/219; 206/222; 222/107; 222/490; 604/408; 604/410

[58] Field of Search ................. 215/11 R, 11 C, 11 E; 206/219, 222; 383/96, 109; 222/107, 490; 604/408, 410

[56] References Cited

U.S. PATENT DOCUMENTS

| 2,550,034 | 4/1951 | Allen | 215/11 E |
|---|---|---|---|
| 2,628,909 | 2/1953 | Horan | 99/171 |
| 2,756,875 | 7/1956 | Yochim | 206/219 |
| 2,885,104 | 5/1959 | Greenspan | 206/219 X |
| 2,916,197 | 12/1959 | Detrie et al. | 206/219 X |
| 2,956,702 | 10/1960 | Ransom | 215/11 |
| 3,061,129 | 10/1962 | Fitzgerald | 215/11 E |
| 3,075,666 | 1/1963 | Hoffstein | 215/11 |
| 3,117,874 | 1/1964 | Horan | 99/171 |
| 3,134,494 | 5/1964 | Quinn | 215/11 E |
| 3,186,628 | 6/1965 | Rohde | 229/66 |
| 3,189,174 | 6/1965 | Cormack | 206/63.2 |
| 3,204,855 | 9/1965 | Boynton et al. | 229/53 |
| 3,206,054 | 9/1965 | Militello | 215/11 E |
| 3,255,923 | 6/1966 | Soto | 383/109 X |
| 3,289,874 | 12/1966 | Dailey et al. | 215/11 |
| 3,386,604 | 6/1968 | Fields | 215/11 |
| 3,406,853 | 10/1968 | McLeod | 215/11 E |
| 3,523,026 | 8/1970 | Emerson et al. | 215/11 E |
| 3,537,225 | 11/1970 | Fields | 53/14 |
| 3,608,709 | 9/1971 | Pike | 206/47 |
| 3,627,611 | 12/1971 | Bonk | 156/306 |
| 3,651,973 | 3/1972 | Yamauchi | 215/11 B |
| 3,756,389 | 9/1973 | Firth | 206/47 A |
| 3,796,337 | 3/1974 | Seunevel | 215/11 C |
| 3,804,952 | 4/1974 | MacDonald | 426/117 |
| 3,871,542 | 3/1975 | Hammer | 215/11 E |
| 3,874,504 | 4/1975 | Verakas | 206/219 |
| 3,950,158 | 4/1976 | Gossett | 206/219 X |
| 3,983,994 | 10/1976 | Wyslotsky | 206/219 |
| 4,000,996 | 1/1977 | Jordan | 62/4 |
| 4,163,509 | 8/1979 | Amneus | 222/95 |
| 4,193,506 | 3/1980 | Trindle et al. | 215/11 C |
| 4,226,330 | 10/1980 | Butler | 206/620 |
| 4,227,614 | 10/1980 | Hollander, Jr. | 206/459 |
| 4,270,533 | 6/1981 | Andreas | 604/410 X |
| 4,312,689 | 1/1982 | Amneus | 156/160 |
| 4,458,811 | 7/1984 | Wilkinson | 206/219 |
| 4,466,547 | 8/1984 | Klittich | 215/11 E |

FOREIGN PATENT DOCUMENTS

| 626284 | 8/1961 | Canada | 215/11 R |
|---|---|---|---|
| 678359 | 1/1964 | Canada . | |
| 1347668 | 2/1974 | United Kingdom . | |

Primary Examiner—William Price
Assistant Examiner—Sue A. Weaver
Attorney, Agent, or Firm—John J. Ryberg; Daniel D. Ryan; Paul C. Flattery

[57] ABSTRACT

A disposable, ready-to-use container such as a nursing container is provided which includes infant formula or other substance to be stored and a nipple or other, dispensing member which is segregated from the environment until use by means of an enclosure chamber. The enclosure chamber is formed by extending the container sheets or wall around the nipple. The enclosure chamber includes a manually breakable line of securement to access the enclosure chamber and the nipple.

12 Claims, 18 Drawing Figures

CONTAINER SUCH AS A NURSING CONTAINER, HAVING FORMED ENCLOSURE CHAMBER FOR A DISPENSING MEMBER

DESCRIPTION

There is a related patent application filed concurrently herewith entitled "Container Such As A Nursing Container, Having Protection Compartment For Dispensing Member", filed in the names of Leonard A. White and Peter C. Carveth, Ser. No. 599,414. That application is assigned to the assignee of the present invention.

BACKGROUND OF THE INVENTION

Various attempts have been made to create a disposable ready-to-use nursing container i.e., a nursing container which the consumer receives with the nursing formula therein and with the nipple already secured to the container.

At present, commercial disposable nursing systems most frequently include a flexible liner which is inserted into a rigid plastic holder. The liner includes an open end which must be wrapped about one end of the rigid holder. A separate container of infant formula must be purchased and opened and the contents placed in the flexible liner. the operator must then stretch a pre-sterilized nipple over the flexible liner and the top of the holder. The operator must have also performed the nipple sterilization procedure. After the nipple is secured to the holder, a securing ring is typically placed about the nipple to hold it more securely to the holder.

This known procedure has several disadvantages. The operator must go to great lengths to ensure cleanliness, especially were the nursing formula is for a very young infant. The nipple must be sterilized in a separate operation. Contamination is possible during the transfer of the formula into the liner. Spillage is common, especially during the step of mounting the nipple on the holder.

While these difficulties are not insurmountable, they do require much time to avoid. The whole operation is made more difficult when away from the home or hospital. Furthermore the procedure must be performed frequently, given the feeding schedule of infants.

Known attempts to resolve these difficulties by creating a container with the nursing formula therein and the nipple already mounted thereon have various disadvantages, including extremely high cost, difficulty of operation and technical difficulties in producing the containers on a commercial scale.

SUMMARY OF THE INVENTION

The present invention solves all the problems discussed above by providing a disposable, ready-to-use nursing container. The container already has the nursing formula or other delivery substance stored therein. The nipple is already mounted to the container and a unique enclosure chamber about the nipple structure provides the necessary degree of sterility. The enclosure chamber is formed simply and with low cost during the manufacturing process by extending the container wall material on the nipple side of the nipple means. A manually breakable line of securement seals the sheets of material about the nipple, forming the enclosure chamber. The container may be easily used by simply placing it into a permanent holder and breaking the breakable line of securement of the enclosure chamber to access the nipple. The container is then ready for use.

In the preferred embodiment, the manually breakable line of securement is the unique selectively openable seal line which is the subject of a patent application by Carveth and Pyde, entitled "Selectively Openable Seal Line and Containers Having Same", U.S. patent application, Ser. No. 532,626, filed Sept. 15, 1983.

The container is not limited to a nursing container but may also be a container for storage of a substance; the container including access means having a base and a dispensing member other than a nipple.

DETAILED DESCRIPTION OF THE PREFERRED EMBODIMENTS

Figure 3:
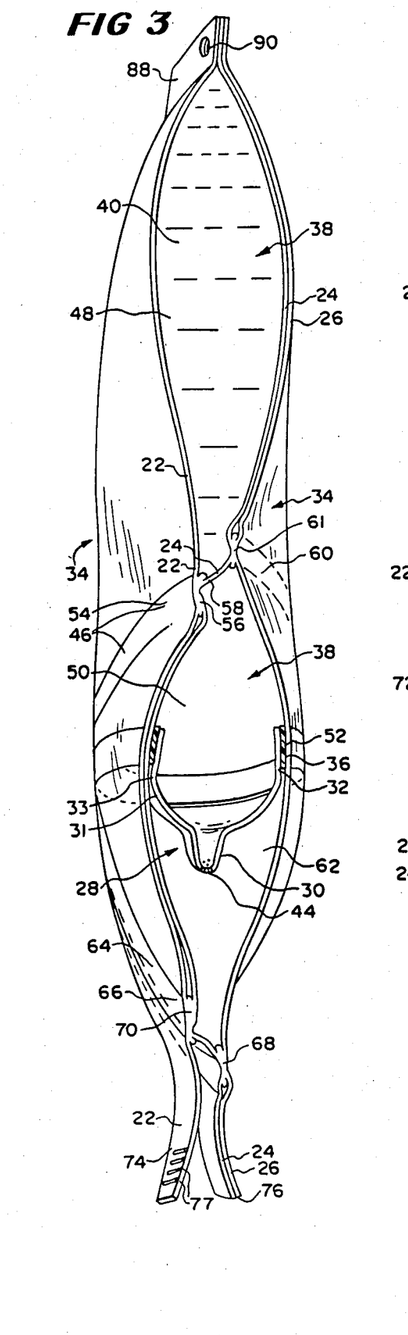
FIG. 3 is a cross-sectional view of the container, taken at line 3—3 of FIG. 1.

Referring to FIGS. 1-4 there is shown a nursing container 20 made from sheets of flexible plastic material such as polyvinyl chloride. With reference to FIG. 3, the container includes a first sheet 22, a second, diaphragm sheet 24, and a third sheet 26 assembled with nipple means 28 having a nipple 30 and a base 32.

The second, diaphragm sheet 24 is sealed about at least a portion of its periphery to the first sheet 22 and also to the third sheet 26 such that the second, diaphragm sheet 24 is intermediate the first and third sheets 22, 26. The first and third sheets 22, 26 are sealed about their entire peripheries and form the exterior wall 34 of the container.

In the preferred embodiment the nipple means is a flexible material forming both the nipple 30 and an enlarged base portion 33. A relatively rigid collar 36 is secured to the enlarged base portion 33 in the preferred embodiment and forms at least part of the base 32. The flexible enlarged base portion 33 may be heat sealed or sealed by other means such as an adhesive to the inside of the collar 36, so that the rigid collar is secured to the outer surface 31 of the enlarged base portion 33.

In the preferred embodiment, the nipple means, including the relatively rigid collar 36, is mounted between the second and third sheets 24, 26, the sheets 24, 26 being secured by means of, for example, a heat seal to the periphery of the base 32 such as at the collar 36, the seal between the container sheets and the nipple means being the base seal 52.

The three sheets 22, 24, 26 define a storage chamber 38 on the base side of the nipple means 28 for the storage of a substance to be delivered through the nipple 30, such as liquid infant formula 40.

One of the unique features of the formula-storing, disposable container 20 is that it provides means for segregating the nipple means 28 from the substance to be stored, such as the liquid infant formula 40, until the time of use. This solves a number of problems. Only the first sheet 22 and second, diaphragm sheet 24 need to be compatible with the formula 40 over extended time periods. The base seal 52 between the nipple means 28 and the container wall 34 will be subject to the formula 40 for only a short time period, during use. There is no need for any specialized nipple sealing structure on the nipple itself to seal the preformed openings 44 of the nipple. There is no need to provide an initially sealed nipple for which a piercing structure must be provided.

More specifically, the container 20 includes a manually breakable line of securement 46 between the first sheet 22 and the second, diaphragm sheet 24 is the storage chamber 38. The breakable line of securement subdivides the storage chamber 38 into a storage compartment 48 for the storage of the formula 40 and a protection compartment 50 adjacent the nipple 30 and base 32 structure to segregate the stored substance 40 from the nipple means. The protection compartment 50 includes no storage substance. The protection chamber 50 is empty except for perhaps a gas such as air which remains in the container 20 after sealing the walls about their peripheries.

Figure 4:
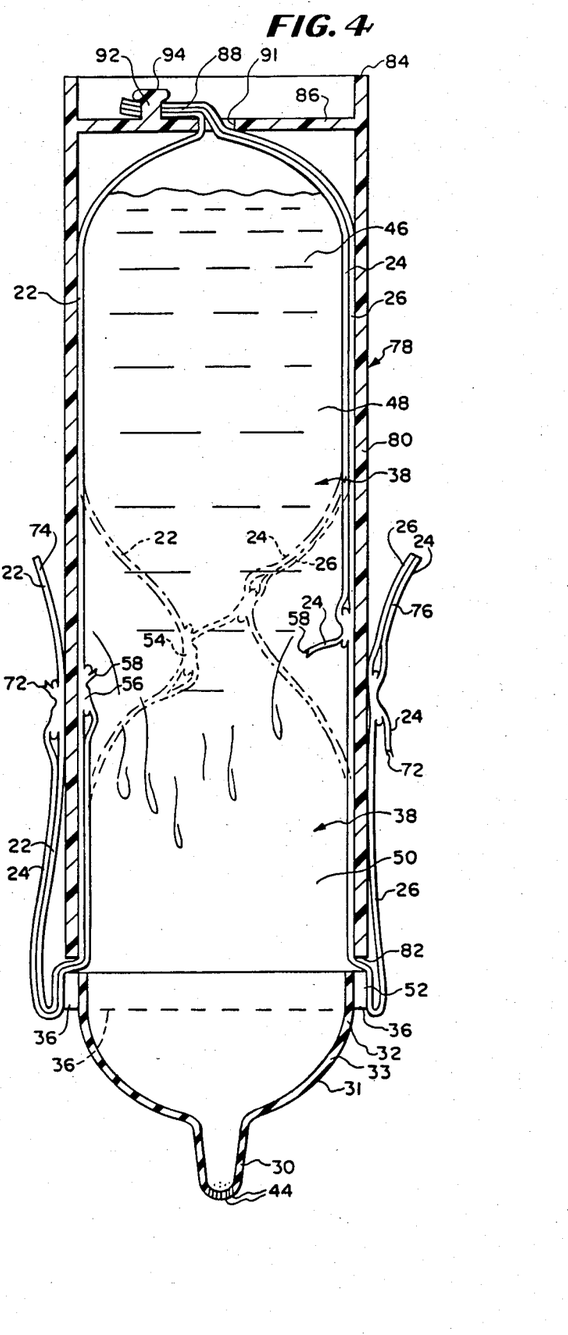
FIG. 4 is a cross-sectional view of the container with the holder.
Figure 11:
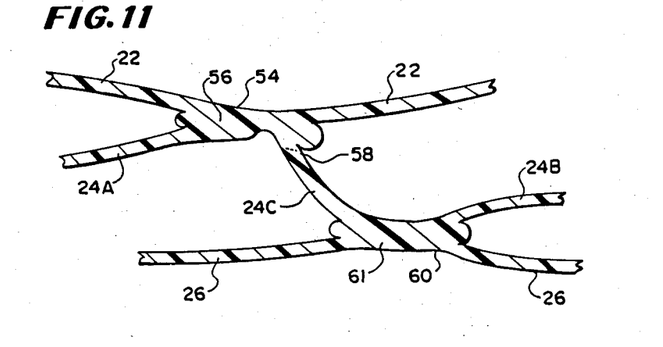
FIG. 11 is an enlarged cross-sectional view of the storage chamber openable seal line and permanent line of securement.
Figures 12, 13, 14:
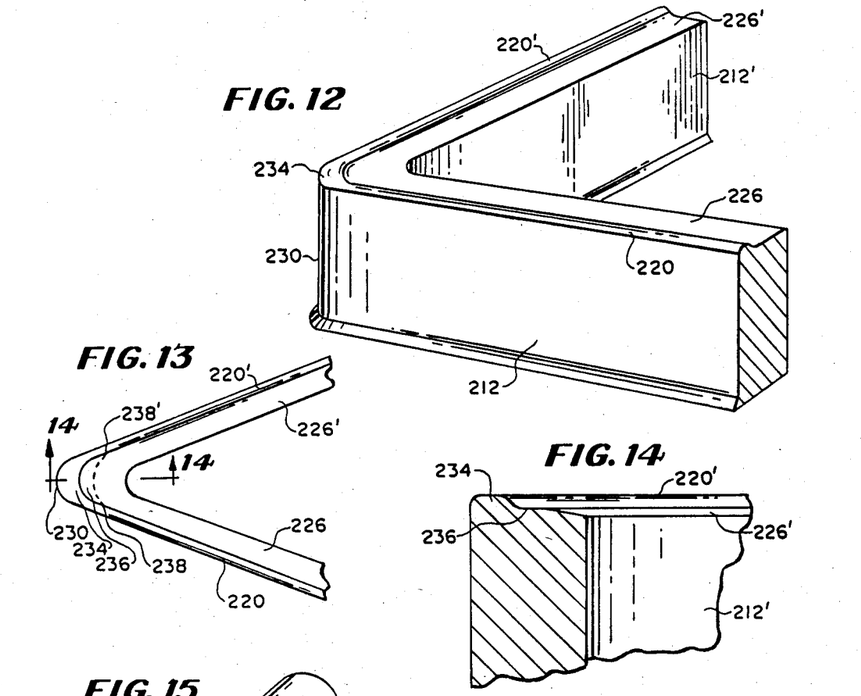
FIG. 12 is a cut away perspective view of the sealing die utilized in making the openable seal lines in the containers of FIGS. 1-4 and FIG. 16 and 18.
FIG. 13 is a top plan view of the sealing die shown in FIG. 12.
FIG. 14 is a cross-sectional view taken along line 14—14 of FIG. 13.

The manually breakable line of securement 46 extends across the storage chamber 38 and in the preferred embodiments of the container is in the form of a unique selectively openable seal line 54, which is the subject of previously filed patent application Ser. No. 532,626 Carveth and Pyde, inventors, entitled "Selectively Openable Seal Line and Containers Having Same". This unique selectively openable seal line 54 and the means for making same are described in detail below, with respect to FIGS. 6–15. For the present discussion relating to the container, however, it should be pointed out that, as seen in FIGS. 3 and 4, the unique selectively openable seal line 54 defines a formed seal 56 in cross section, having a break line 58 at the second sheet 24. The selectively openable seal line 54 is opened by manually grasping the outer opposed sheets of the container 20, such as sheets 22 and 26 and pulling them apart, which results in the rupture of the seal 56 at the break line 58. To enhance the selective opening of the seal line 54, it is preferred that a permanent line of securement 60 be provided between the second and third sheets 24, 26 in the storage chamber 38, the permanent line of securement 60 extending substantially parallel to, and substantially the length of the storage chamber breakable line of securement 46, which in the enlarged, cross-sectional view of the seal line 54 and permanent line of securement 60 is seen in FIG. 11.

Figures 1, 2, 5:
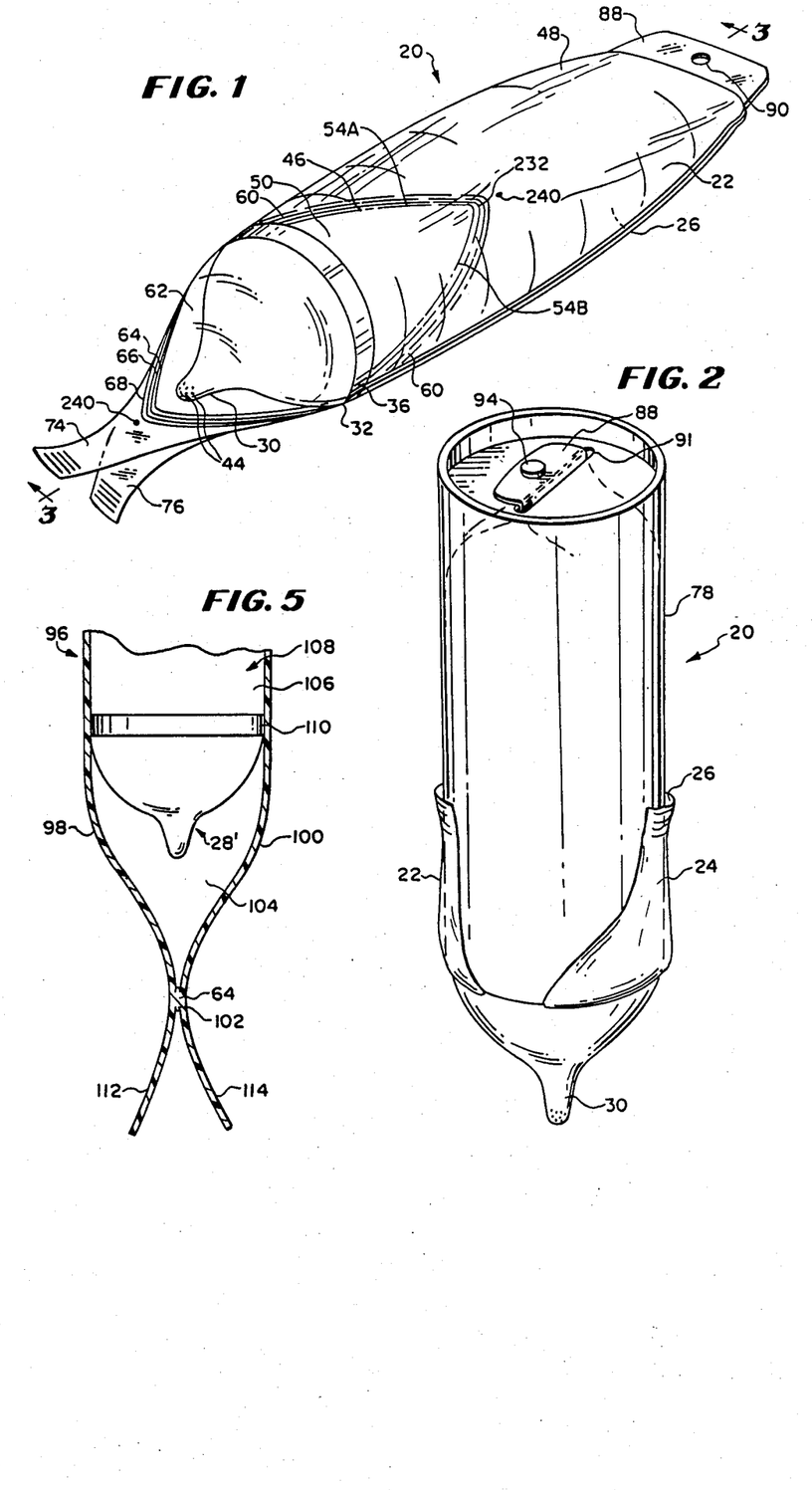
FIG. 1 is a perspective view of the container including storage and protection compartments and enclosure chamber.
FIG. 2 is a perspective view of the container, including a holder, with the enclosure chamber opened.
FIG. 5 is a cross-sectional, fragmentary view of an alternate embodiment of the container and enclosure chamber.

Referring to FIGS. 1 and 3, the container 20 also preferably includes unique structure defining an enclosure chamber 62. This structure is provided by extending the sheets 22, 24, 26 beyond the base seal 52 onto the nipple side of the nipple means 28, opposite the storage chamber 38. The sheets 22, 24, 26 are secured together on the nipple side of the nipple means to define the enclosure chamber 62. There is no communication between the storage chamber 38 and the enclosure chamber 62 at the base seal 52. Because of the openings 44 in the nipple 30, the enclosure chamber 62 and the protection compartment 50 of the storage chamber 38 are in open communication. This is not a problem however, because there is only residual gas such as air in both the protection compartment 50 and the enclosure chamber 62. The enclosure chamber 62 encloses the nipple means on the nipple side, segregating the nipple means from the enviroment. As mentioned earlier, the first and third sheets are sealed about their entire peripheries, including that portion defining the enclosure chamber 62. In the preferred embodiment illustrated, the second sheet is also sealed about its periphery between the first and third sheets.

The enclosure chamber 62 is opened by means of a manually breakable line of securement 64 between the first sheet 22 and the second, diaphragm sheet 24 to selectively separate the first and second sheets and to open the enclosure chamber 62, providing access to the nipple 40. In the preferred embodiments the enclosure chamber manually breakable line of securement 64 is in the form of a unique selectively openable seal line 66 made like the storage chamber openable seal line 54. The enclosure chamber 62 is further defined by an enclosure chamber permanent line of securement 68 disposed between the second and third sheets 24, 26 and extending substantially parallel to, and substantially the length of, the enclosure chamber breakable line of securement 64, which in the preferred embodiment is the selectively openable seal line 66.

The seal line 66 defines a formed seal 70 in cross section having a break line 72 at the second sheet 24.

The first sheet 22 continues to extend past the enclosure chamber seal line 62 as an extension flap 74. The second and third sheets 24, 26 are sealed together past the permanent line of securement 68 and form a second extension flap 76. The extension flaps 74, 76 may include raised ribs 77 for improved gripping.

Referring now to FIGS. 2 and 4, the container 20 also preferably comprises a holder 78 having a substantially cylindrical side wall 80, an open top end 82 and a bottom end 84. The holder 78 is sized so that the flexible sheet material with the storage substamce therein may fit into the holder 78. In the preferred embodiment the side wall 80 has inner and outer diameter measurements at the open top end 82 which are substantially the same as inner and outer diameter measurements of the collar 36 forming part of the nipple means 28. When the holder 78 is placed with its bottom end 84 on a table top or other surface, the collar 36 rests indirectly on the open top end 82 of the holder 78.

The holder 78 preferably also includes an end wall 86 recessed from but near to the bottom end 84 and having means for attaching one of the sealed edges of the storage chamber thereto such as the sealed edge 88, having a hole 90 therethrough. In the embodiment shown, the defined storage chamber 38 is secured to the holder 78 by passing the sealed edge 88 through a slot 91 in the end wall 86 and forcing the hole 90 in the sealed edge 88 over a rigid post 92 having an enlarged top 94. It is seen that there may be various means for securing the defined storage chamber 38 and nipple means 28 to the holder 78. It is also possible to utilize the container 20 without the holder 78. The holder 78 merely serves to provide ridigity for grasping during use.

The container 20 is preferably used by first opening the selectively openable seal line 54 which subdivides the storage chamber 38 into the storage and protection compartments 48, 50, by grasping the opposite sheets, breaking the seal line 54 along its length, shown in cross section as at the break line 58. When the storage chamber seal line 54 is broken the infant formula or other storage substance 40 is free to flow into the formerly empty protection compartment 50 in open communication with the openings 44 in the nipple 30. FIG. 4 illustrates with phantom lines the general appearance of the sheets at and near the selectively openable seal line 54 before the seal line 54 is opened, but it must be remembered that the seal line 54 is broken before mounting the defined storage chamber 38 within the holder 78. The phantom lines serve to show the change in the container shape after the seal line 54 is broken.

The container 20 is then mounted within the holder 78 as discussed above. The nipple means 28 is then accessed by breaking open the enclosure chamber 62. This is preferably done by grasping the extension flaps 74, 76 and separating them, breaking the selectively openable seal line 66 in the enclosure chamber 62 along the length of the seal line 66 as seen in cross-section as at the break line 72.

The sheet extensions, that is the portion of the sheets from the base seal 52 to the extension flaps 74, 76 are then folded back away from the nipple 30 as best seen in FIGS. 2 and 4.

As defined above, the preferred embodiment of the container 20 includes the unique selectively openable seal line 54, 66 as the manually breakable lines of securement 46 and 64, respectively. However, it is envisioned that other manually breakable lines of securement 46, 64 are possible. For example, a modified form of the container 96 shown in FIG. 5 might include only two sheets 98, 100, without a middle diaphragm sheet. This would be possible if for example the two sheets 98, 100 are sealed together with a heat seal strong enough to prevent inadvertent opening but weak enough to break when desired without breaking through the sheets 98, 100 themselves. As seen in FIG. 5, the two sheets 98, 100 could surround and be sealed to nipple means 28' like the nipple means 28 discussed with reference to FIGS. 1-4. The manually breakable line of securement 64 could be some form of weakened heat seal 102 to form an enclosure chamber 104. Another weakened heat seal (not shown) like the weakened heat seal 102 could be provided between the sheets 98, 100 on the base side of the nipple means 28' to form a protection compartment 106 in the storage chamber 108. In the less preferred embodiment of FIG. 5, the two sheets 98, 100 of flexible material would of course be sealed together along their edges to define the storage chamber 108 in the enclosure 104. There is still no communication between the chambers 104, 108 at the base seal 110.

The enclosure chamber 104 may be accessed by separating the extension flaps 112, 114, breaking the weakened heat seal 102. Similarly, the weakened heat seal subdividing the storage chamber 108 could be broken by separating the two sheets 98, 100 near the weakened heat seal.

Figures 16, 17, 18:
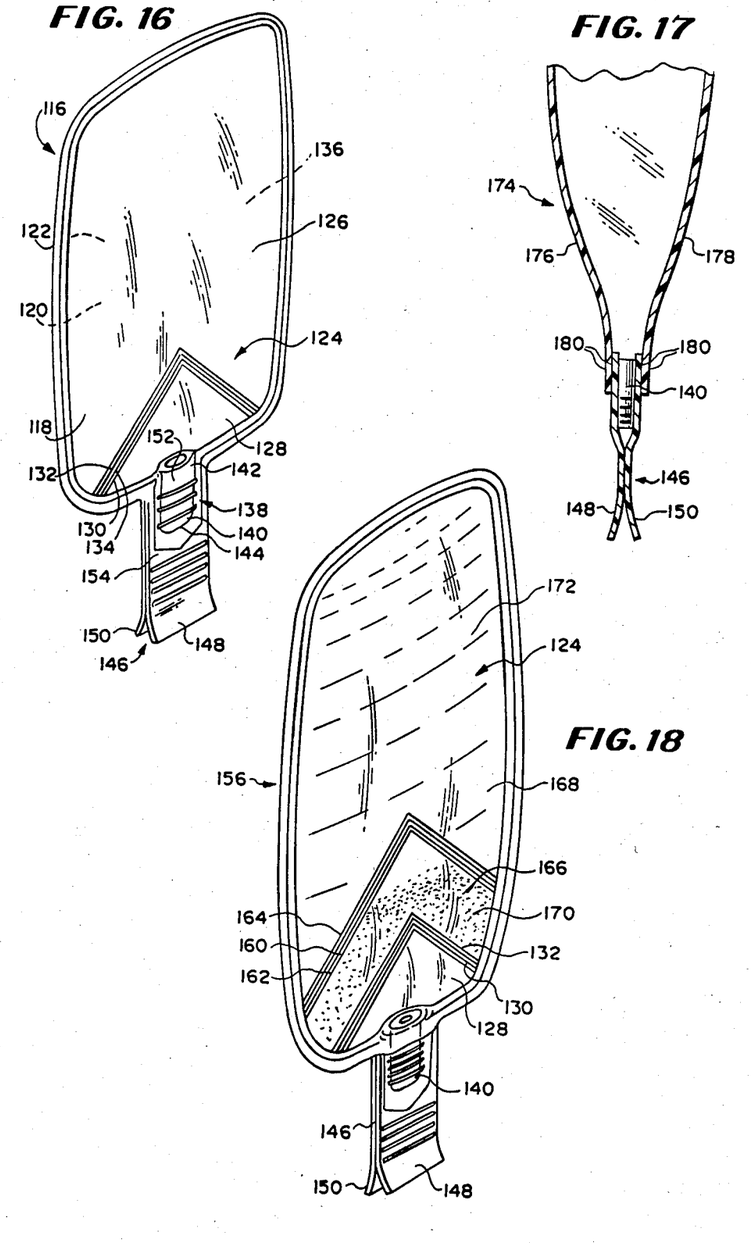
FIG. 16. is a perspective view of a container including a storage chamber breakable line of securement and insert tabs to segregate the nipple from the environment.
FIG. 17 is a fragmentary cross-sectional view of a modified container, but including the insert tabs.
FIG. 18 is a perspective view of a container like the container in FIG. 16, with the addition of a second breakable line of securement in the storage chamber to create an additional storage compartment.

Another container 116 is illustrated in FIG. 16. The container 116 includes a first sheet 118, a second, diaphragm sheet 120 and a third sheet 122. The sheets define a storage chamber 124 subdivided into a storage compartment 126 and a protection compartment 128 by a storage chamber breakable line of securement 130, opposite which is a storage chamber permanent line of securement 132. In the preferred embodiment of the container 116 the breakable line of securement 130 is a unique selectively openable seal line 134.

Liquid infant formula 136 is stored in the storage compartment 126. The protection compartment 128 contains nothing except perhaps residual gas trapped during the manufacturing process. As described above, the container 116 may be of a construction which is on the base side of the nipple means 28 similar to the container 20.

The container 116 includes nipple means 138 which may be, for example, a flexible plastic hollow cylinder forming both a nipple 140 and a base 142. The nipple 140 includes openings 144 in an otherwise closed end for passage of the storage substance 136 therethrough. The container 116 further includes a nipple cover 146, including two flexible tabs 148, 150. Each of the tabs 148, 150 is interposed and secured between the nipple and the sheets. The flexible tab 148 is disposed between the second, diaphragm sheet 120 and the nipple 140. The other flexible tab 150 is disposed between the third sheet 122 and the nipple 140. The sheets 118, 120, 122 are secured to the periphery of the nipple base 142 at a base seal 152 by means of for example a heat seal. In the preferred embodiment, the flexible tabs 148, 150 are included so that the tabs are sealed at the base seal between the sheets and the nipple base 142.

The flexible tabs 148, 150 are sealed together with a frangible seal around the nipple such as a weakened heat seal 154, which may be opened by pulling the tabs 148, 150 apart, providing access to the nipple 140.

As illustrated in the drawings, the nipple means 138 utilized in the container 116 shown in FIG. 16 is typically smaller than the nipple means 28 in the container 20 shown in FIGS. 1-4. The nipple cover 146 in the container 116 separates the nipple from the environment. Such a structure necessitates the need for a separate manufacturing step, i.e. the insertion of the separate flexible tab parts. However, the use of the smaller seal area makes possible the use of a standard weakened heat seal 154 to enclose the nipple 140, as opposed to the selectively openable seal line 66 in the container 20.

Referring now to FIG. 18, there is shown a container 156 which may be identical to the container 116, except that a second manually breakable line of securement 160 may be provided between the sheets in the storage chamber 124. As with the seal line 134, the second line of securement 160 may also be the unique selectively openable seal line 162. A second permanent line of securement 164 is provided opposite the selectively openable seal line 162. This arangement subdivides the storage compartment into first and second storage compartments 166, 168. The protection compartment 128 remains. The container 156 is useful where the final substance to be delivered through the nipple 140 is not stable during storage for extended time periods. As shown in FIG. 18, the first storage compartment 166 may include a dry powdered material 170 such as powdered formula and the second storage compartment 168 may include water 172.

To utilize the container 156, the second selectively openable seal line 162 is opened first, placing the first and second storage compartments in open communication for mixing the powder 170 and liquid 172. The first selectively openable seal line 134 may then be opened, thereby opening the protection compartment 128 for delivery of the now mixed formula through the nipple 140, after the flexible tabs 148, 150 are separated.

Referring now to FIG. 17, there is illustrated a modified container 174 similar to the containers 116, 156 in construction except that only two sheets 176, 178 of material are used. This is not the preferred container structure because it requires breakable lines of securement 130, 160 formed by means other than the selectively openable seal lines 134, 162. As discussed with reference to FIG. 5, such a breakable line of securement may be a purposefully weakened heat seal between the two sheets.

The nipple cover shown in cross section in FIG. 17 is like the nipple cover 146 shown in FIG. 16 and 18, including two flexible tabs 148, 150, each interposed between a sheet of material and the nipple 140 at a base seal 180.

The reader's attention is now referred to FIGS. 6–15 for more detail on the structure and method of manufacture of the selectively openable seal line such as selectively openable seal lines 54, 66, 134, and 162. The seal line is also described in U.S. patent application Ser. No. 532,626 referenced above. Although the seal line 54 and container 20 are specifically discussed, this description is also pertinent to the seal lines 66, 134 and 162 and the containers 116 and 156.

The seal line 54 in the container 20 includes seal line portion 54A and mirror image seal line portion 54B.

Figure 6:
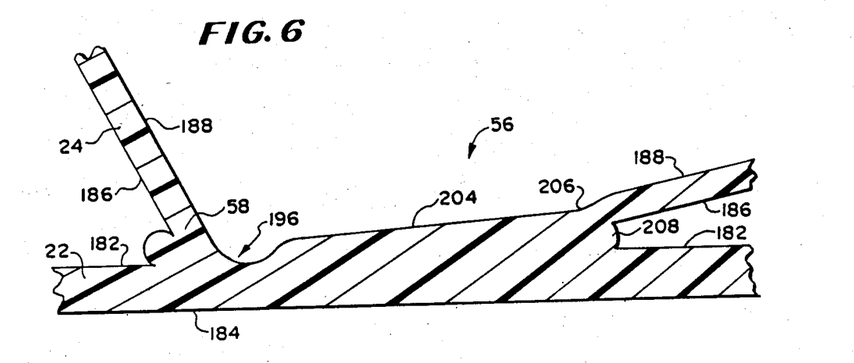
FIG. 6 is a cross-sectional view of the selectively openable seal line preferably employed for both the enclosure chamber and storage chamber breakable lines of securement, illustrating the formed seal.
Figure 7:
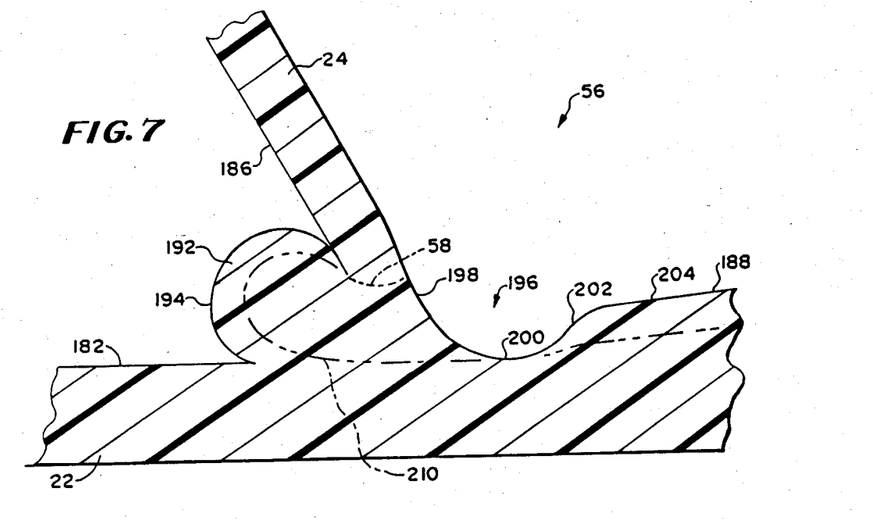
FIG. 7 is an enlarged, fragmentary cross-sectional view illustrating the seal line shown in FIG. 6 and the break line and break end.
Figure 8:
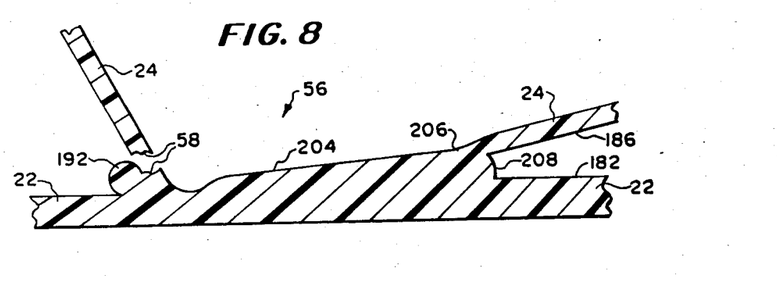
FIG. 8 is a cross-sectional view of the seal line as in FIG. 6, after the seal line has been broken at the break line.

A cross-section of the seal line portion 54A is seen in FIGS. 6 through 8. These Figures show the formed seal 56 between the first sheet 22 and the second sheet 24. In other words, the seal is the cross-section of the seal line.

The first sheet 22 of the container 20 includes a first inner surface 182 of a thermoplastic material and a first outer surface 184. The second sheet 24 includes a second inner surface 186 of a thermoplastic material and a second outer surface 188. The second inner surface 186 has melt-flow characteristics substantially identical with the melt-flow characteristics of the first inner surface 182. Preferably, the first and second inner surface 182, 186 are made of the same material. As will be seen later, the first and second sheets may be laminated or coextruded structures including multiple layers of materials to impart different properties to the sheets.

The first and second inner surfaces 182, 186 are secured to each other at the seal 56. The seal 56 and therefore the seal line 54 are formed by a focused energy source which melts the first and second inner surfaces 182, 186 at the seal 56. Preferably, the focused energy source is radio-frequency (RF) energy applied through a unique sealing die 190, seen for example, in FIGS. 9, 10 and 12 through 14. The term "focused energy" is not meant to include conductive heat energy but may include ultrasonic energy. The seal 56 is also preferably made by applied pressure as well as by the focused energy.

Referring to FIG. 7, the seal 56 includes a bead area of increased thickness 192 at a break end 194 of the seal 56, between the first and second inner surfaces 182, 186, respectively. The bead area of increased thickness 192 is coextensive with the first and second inner surfaces 182, 186 along less than all of the surface of the bead area. Thus, the FIGS. 6 through 8 there is shown a space between the first and second sheets 22, 24 to the left of the break end 194.

Unlike what might be expected, the seal 56 breaks at a break line 58 which is disposed inwardly of the break end 194 and between the second sheet 24 and the bead area of increased thickness 192. The break line 58 defines the boundary between the second sheet 24 and the bead area 192. The width of this boundary area defined by the break line 58 is at the least not subtantially less than the thickness of the second sheet 24. In fact, the width of the boundary area may be equal to or greater than the thickness of the second sheet 24.

The seal 56 further includes an arcuate depression 196 including a concave downward surface 198 extending from substantially adjacent the break line 58 to a minimum seal thickness point 200. It is important to note that the seal does not break at the minimum seal thickness point 200. The distance between the minimum seal thickness point 200 and the first outer surface 184 is preferably not less than the thickness of the first sheet 22 and at the most not substantially greater than the thickness of the first sheet.

The arcuate depression 196 preferably also includes a concave upward surface 202 extending upwardly from the minimum seal thickness point 200, away from the concave downward surface 198.

The seal 56 also preferably includes a beveled surface 204 defined by the second outer surface 188, beyond the concave upward surface 202. The beveled surface 204 preferably begins adjacent the concave upward surface 202. The thickness of the seal 56 increases along the beveled surface 204 from the concave upward surface 202 to a bevel end 206 of the seal 56.

The bevel end 206 may be defined in part by a secondary bead area 208 of excess material. The second sheet 24 extends away from the seal 56 intermediate the beveled surface 204 and the secondary bead area 208.

The thickness of the second sheet 24 is at the most not substantially greater than the thickness of the first sheet 22. Preferably, the thickness of the second sheet 24 is less than the thickness of the first sheet and, most preferably, at least about 0.003 in. less than the thickness of the first sheet 22. For illustration purposes only and not as a limitation, the first sheet may have a thickness of 0.015 in. and the second sheet may have a thickness of 0.010 in.

By way of example only, and not intended as limitation, the following are other sample measurements for the seal 56. The width of the arcuate depression may be about 0.02 in. The bevel may extend away from the arcuate depression 196 at an angle of approximately 5° from horizontal. The width of the seal from the beginning of the arcuate depression 196 to the bevel end 206 may be about ⅛ in.

As stated earlier, the first and second inner surfaces 182, 186 are preferably of the same material. It is believed that polyvinyl chloride, ethylene vinyl acetate (EVA) and SARAN ™ are all materials which work well in making the seal 56. The entire sheets may be made of these materials or just the inner surfaces.

While the mixing of the material from the first and second sheets 22, 24 at the seal 56 is not known, it is believed to approximate the phantom boundary line 210 seen in FIG. 7. In one test, the first sheet 22 was dyed as distinctly different color than the second sheet 24. The seal 56 was then made, resulting in a boundary such as shown at line 210. Thus, it is believed that the bead area of increased thickness 192 comprises material from both of the first and second sheets 22, 24. However, it is also believed, but not known, that the break line 58 comprises material only from the second sheet 24. Thus, the phantom break line 58 illustrated in FIG. 7 is not intended to be a part of phantom boundary line 210.

Figure 9:
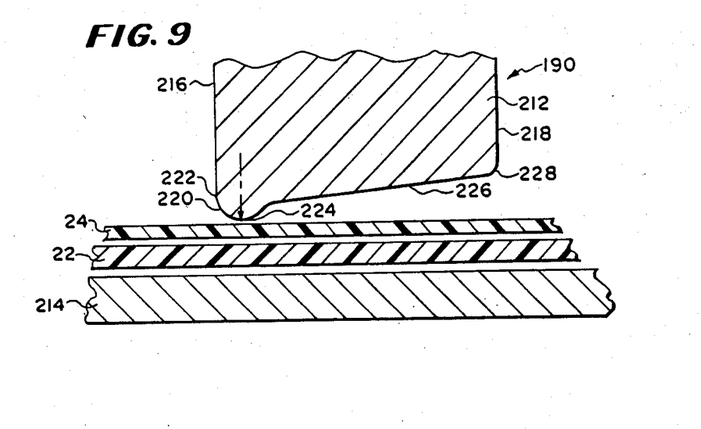
FIG. 9 is a cross-sectional schematic view illustrating the sealing die before forming the selectively openable seal line.
Figure 10:
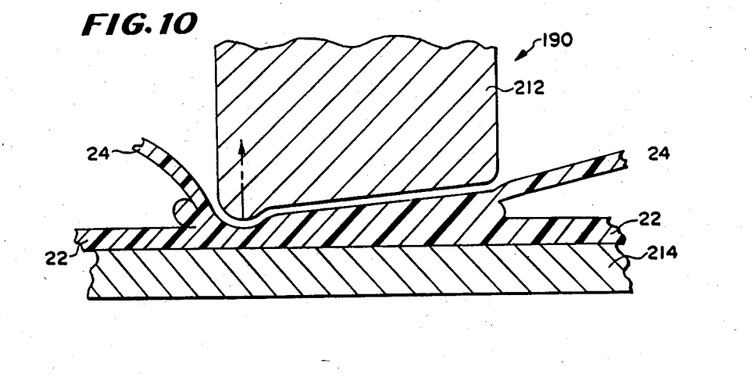
FIG. 10 is a cross-sectional view illustrating the formed seal and sealing die.

Referring now to FIGS. 9 and 10 and 12 through 14, there is illustrated a sealing die 190 for making the selectively openable seal lines such as the seal lines 54, 66 shown in the container 20, as well as the method for making the seal lines. Referring first to FIGS. 9 and 10, there is shown the metal die head 212 of the sealing die 190. The mirror image die head 212' is not shown, but is discussed below with reference to FIGS. 12 through 14. Initial explanation of the die head 212 is useful in understanding the manufacture of the seal 56 seen in FIGS. 3, 4 and 6 through 8. The sealing die 190 also includes an unheated or cold plate 214 opposite the die head 212. The first and second sheets 22, 24 are mounted between the die head 212 and the plate 214 during formation of the seal line 54.

FIGS. 9 and 10 illustrate the metal die head 212 in cross-section. The metal die head 212 has first and second die sides 216, 218 respectively. Immediately adjacent the first die side 216 is a convex rounded projection 220. The convex rounded projection 220 merges at one side thereof into the first die side 216 at a first die side end 222. The convex rounded projection 220 further includes a point of maximum projection 224. A bevel 226 extends from the rounded projection 220 to the second die side 218 at a second die side end 228. The bevel 226 recedes from the point of maximum projection 224 in the vertical direction. For purposes of this application, the words "horizontal" and "vertical" are made with reference to the drawings only. It should be understood that, for example, the seal line 54 may be formed with the sheets 22, 24, metal die head 212 and unheated plate 214 oriented ninety degrees or any angle from that shown in FIGS. 9 and 10.

The vertical distance between the point of maximum projection 224 on the rounded projection 220 and the second die side end 228 is preferably greater than the vertical distance between the point of maximum projection 224 and the first die side end 222. It is believed that the vertical distance between the first die side end 222 and the point of maximum projection 224 should not be greater than the thickness of the second sheet 24. The bevel 226 extends away from the rounded projection 220 at approximately 5° from horizontal. The vertical distance between the first die side end 222 and the point of maximum projection 224 may be in the range from about 0.007 to about 0.008 in. for example. The rounded projection 220 may have a width of about 0.020 in. The width of the sealing die between the first and second die sides 216, 218 may be about ⅛ in. These sample measurements of the sealing die would be appropriate when utilizing first and second sheets 22, 24 having thicknesses of about 0.015 and 0.010 in., respectively.

As stated above, the seal 56 and resulting seal line 54 are formed by mounting the first and second sheets 22, 24 between the metal die head 212 and unheated plate 214. Focused energy is applied through the die head 212 and is preferably radio-frequency (RF) energy. The die head 212 is lowered into contact with the second sheet 24. Pressure may be applied simultaneously with the focused energy. After the seal 56 is formed, the metal die head 212 is lifted away, such as shown in FIG. 10.

The sheets 22, 24, 26 of the container are preferably flexible and it is preferred that each sheet is made at least partially of a thermoplastic. The peripheries of the first, second and third sheets 22, 24, 26 may be sealed with a standard heat seal. In order to provide quick opening and communication between the compartments 48, 50, the seal line 54 extends across the entire width of the container, although this is not necessary to the operation of the container. The seal line 54 has a substantially chevron shape. The second, diaphragm sheet 24, the breakable line of securement 46 and the third sheet 26 together define the protection compartment 50. The first sheet 22, the breakable line of securement 46 and the second, diaphragm sheet 24 together define the storage compartment 48.

Although not necessary, it is highly preferred that the container 20 also include the permanent line of securement 60 between the second, diaphragm sheet 24 and the third sheet 26. The permanent line of securement 60 extends substantially parallel to and substantially the length of, the breakable line of securement 46. With the inclusion of the permanent line of securement 60 the storage and protection compartments 48, 50 are further defined by the permanent line of securement 60. The permanent line of securement 60 may be a standard heat seal, for example, such as shown by the seal 61 in FIG. 3. The seal 61 refers to the cross-sectional configuration of the permanent line of securement 60.

As illustrated in FIG. 1, it may be desirable to extend the breakable line of securement 46 entirely across the container, spanning the peripheral seal of the first and second sheets 22, 24. As seen in FIG. 11, this creates a protection compartment portion 24A of the second, diaphragm sheet 24. Thus, the storage compartment 48 is exclusive of a boundary with the protection compartment 50 at the portion 24A of the second diaphragm sheet 24.

Similarly, it would then be desirable to extend the permanent line of securement 60 entirely across the container 20, spanning the peripheral seal of the second and third sheets 24, 26, thereby creating a storage compartment portion 24B of the second sheet bounded in part by the permanent line of securement 60. Thus, the protection compartment 50 is then exclusive of any boundary with the storage compartment 48 at the storage compartment portion 24B of the second sheet. When, as is preferred, the breakable and permanent lines of securement 46, 60 both extend entirely across the container, a common portion 24C of the second sheet is thereby created. With this configuraton of the compartments 48, 50 share a boundary only at the common portion 24C of the second sheet 24.

With particular reference to the container 156 shown in FIG. 18, such a configuration, with the common portion of the second sheet, has at least two distinct advantages. First, the two stored components do not overlap. Thus, if it is desirable to inspect the container contents before mixing and the container wall is transparent or translucent, it is possible to inspect each component separately without also viewing the other component. Secondly, and more importantly, such a structure drastically limits the common border of the first and second storage compartments 166, 168. This is important for limiting the transmission of moisture or gas into one of the chambers from the other through the material of the second sheet 24. The area is thus limited to the breakable and permanent lines of securement and the common portion of the second sheet.

In this regard, the containers 20, 116, 156 may be made from a variety of different plastic materials. These include, without limitation, polyvinyl chloride, ethylene vinyl acetate (EVA) and SARAN TM. What appears to be important when making the selectively openable seal line 54 is that the first inner surface 182 of the first sheet 22 and the second inner surface 186 of the second sheet 24 be thermoplastic materials having similar or identical melt-flow characteristics, in order to enable manufacture of the unique seal 56.

In order to limit the transmission of moisture into and out of the container compartments it may be desirable to utilize various laminate structures in making the container. Two examples of exceptional moisture and gas transmssion barrier materials are SARAN and aluminum foil. The second sheet 24 may be manufactured with a layer of, for example. SARAN or foil or other high barrier property material, allowing the inner surface 186 of the diaphragm sheet 24 to be maintained as a thermoplastic material similar to the material of the inner surface 182, in order to permit a proper seal between the first and second sheets 22, 24.

However, it must be remembered that the first and third sheets 22, 26, as well as the second sheet 24, may also be laminate structures comprising at least two or more layers of material to prevent the transmission of air into the container through the wall and to prevent the loss of liquid out of the container. Alternatively, if high moisture or air transmission barrier properties are needed the container may be placed in a barrier overpouch (not shown) such as of a polyolefin material.

It is believed that the unique container structure utilizing the permanent line of securement 60 closely parallel to or opposite the breakable line of securement 46 greatly facilitates the easy selective breaking of the second sheet, because the common portion 24C is stretched between the permanent seal 61 and the breakable seal 56. The breakable seal 56 ruptures, placing the two chambers in communication. When the permanent line of securement 60 is not included, the opening action by the operator is the same except that the first and second, instead of first and third sheets are grasped. The second sheet is grasped from the container-exterior, so that the second and third sheets are folded between the thumb and index finger of one hand.

Referring once more to the sealing die, as stated above, when the selectively openable seal lines 54, 66 are utilized as the breakable lines of securement 46, 64 in the container 20, the seal line 54 may be manufactured utilizing the sealing die 190 illustrated in FIGS. 9, 10, and 12 through 14. The sealing die 190 has a general chevron shape corresponding to the shape of the seal lines 54, 66. The chevron shape preferably at least begins at an angle of less than 90° and may widen to an angle of less than 180°. The sealing die 190 includes a sealing die end 230. The sealing die end 230 is the point at which the die head 212 and mirror image die head 212' converge and corresponds to the seal line opening end 232 of the seal line 54. the die head and mirror image die head 212, 212' include, about the sealing die end 230, and end convex rounded projection 234 which is substantially wider than and which narrows into the convex rounded projections 220, 220' of the die heads 212, 212'. Further included is a flat 236, intermediate the end convex rounded projection 234 and the bevel 226, 226' the flat 236 narrowing to a point 238, 238' in both the die head 212 and mirror image die head 212' whereat the bevel 226, 226' begins adjacent the rounded projection 220, 220'. The width of the bevel 226, 226' remains constant throughout the entire length of the sealing die, including the sealing die end 230.

When the selectively openable seal line 54, 46 is made utilizing the sealing die 190, a seal line opening end 232 results which includes an opening arcuate depression which is substantially wider than and which narrows into the seal arcuate depression 196 and mirror image arcuate depression (not shown). As an example, the width of the opening arcuate depression at the opening end 232 may be about 0.04 in. and may narrow to about 0.02 in. at the arcuate depression 196 and mirror arcuate depression (not shown). The seal line 54 will thus also have an opening end seal 232 having a corresponding seal flat surface intermediate the concave upward surface 202 and the beveled surface 201. The flat surface will narrow to a point into the seal line portion 54A and mirror image seal line portion 54B of the seal line 54 whereat the beveled surface 204 of the seal 56 begins adjacent the concave upward surface. It follows that the width of the beveled surface 204 of the seal line 54 shall remain constant through the entire length of the seal line when the sealing die 190 is employed. The seal line opening end 232 corresponds to the tip of the chevron shape.

As a simple test to assure that the breakable line of securement 46 has not been even partially opened, a tack seal 240 may be provided between the first and second sheets 22, 24 and spaced from the seal line opening end 232, the seal line opening end 232 most probably being the weakest point in the breakable line 54, 46. The tack seal 232 will break before the breakable line 46 opens. The tack seal, which may be a small-area, weak heat seal, makes a small but audible noise when broken. thus, if the noise is heard when breaking the line of securement 46, one knows that the seal line opening end 232 has not been disturbed.

Figure 15:
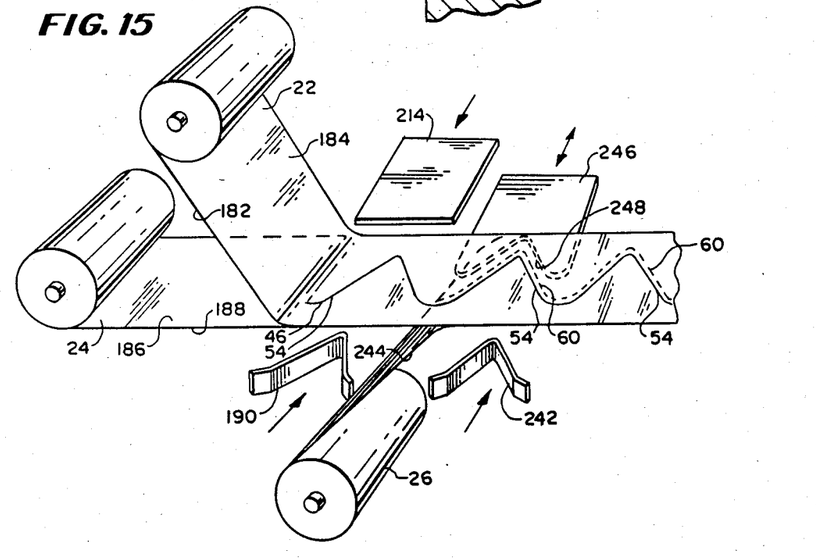
FIG. 15 is a schematic view illustrating the manufacturing process.

Referring now to FIG. 15, there is illustrated a schematic view of the manufacturing procedure for the seal line 54, which may also be employed for the seal lines 66, 134 and 162.

A continuous supply of the first, second and third sheets 22, 24, 26 is provided, typically in the form of roll stock. The sheets are aligned such that the first and third sheets 22, 26 are substantially coextensive, with the second sheet intermediate the first and third sheets. For purposes of illustration only, the first and third sheets may be ethylene vinyl acetate having a thickness of 0.015 in. The second sheet 24 may have inner and outer surfaces of ethylene vinyl acetate and an inner layer of SARAN or foil, the second sheet 24 having a thickness of about 0.010 in.

The seal line 54 is then formed. The sealing die 190 is brought into contact with the second, diaphragm sheet 24 on the oppposite side of the first sheet 22. The unheated or cold flat plate 214 preferably of metal is disposed against the first sheet 22 opposite from the second sheet 24. The focused energy is then applied through the sealing die 190.

If the breakable line of securement 46 does not employ the openable seal line 54, but instead utilizes a weakened seal line such as may be made by forming a line of thinner material, the unique sealing die 190 may be replaced with the appropriate known die to produce such a weakened seal line.

In the preferred embodiment using the openable seal line 54, the seal line 54 is formed utilizing a Thermatron RF Sealing Machine, Model No. KF62/SP40, sold by Solidyne, Inc. of Bay Shore, N.Y. The sealing machine is listed at 6,000 watts and the RF energy is applied at 27 Megahertz, within six percent.

The sealing die 190 is in contact with the second sheet 24 typically for a period of as much as five or six seconds, although the contact time may be as little as about three seconds and may be still further reduced. The RF energy is preferably applied somewhere in the middle of the contact time period and may be applied for about one second or longer.

The openable seal line 54, illustrated by the seal 56 in cross-section, is formed with the application of relatively little pressure. For example, a peripheral heat seal sealing the peripheries of the sheets may involve the use of as much as 500 psi. The openable seal line 54 utilizes pressure of probably less than 25 psi. The sealing machine may be set to include a stop on the die approximately 0.004 in. into the second sheet 24. It may indeed be possible to make the seal 56 without the application of any pressure whatsoever. It is preferred that the unheated or cold plate 214 is maintained at a relatively cold temperature by, for example, water cooling the plate 214. The cold plate serves to prevent or drastically reduce any indentation of the outer surface 184 of the first sheet 22, i.e., it reduces the effect of the RF energy at the outer surface 184. After the seal line is formed, the sealing die 190 and cold plate 214 are disengaged and the three sheets, the first and second sheets now being attached, travel to the next station, where the permanent line of securement 60 is formed. The permanent line of securement may be formed with a standard flat sealing die 242 shaped to create a permanent line of securement 60 which runs parallel to the seal line 54. The permanent line of securement 60 may be made upon the application of heat and pressure and may utilize RF energy. The standard sealing die 242 may be urged against the third outer surface 244. A glass buffer 246 may be inserted between the first and second sheets 22, 24. The glass buffer 246 preferably has a cut-out end 248 corresponding with the seal line 54, so that the buffer 246 may be brought fairly close, if not adjacent to, the seal line 54. An additional glass buffer (not shown) may also be employed adjacent the first outer surface 184 of the first sheet 22.

The sheets may then be translated to another station where the nipple means 28 is inserted between the second and third sheets 24, 26 and the base seal 52 is formed. Then, at another station, the seal line 66 and line of securement 68 are formed, in the same manner as lines 54 and 60.

The sheets are then translated to another station to permanently seal the first and third sheets about their peripheries and to seal at least a portion of the periphery of the second sheet. Typically, as shown in FIG. 15 and as utilized in the preferred embodiment, the second sheet 24 is provided from roll stock of the same width as the first and third sheets 22, 26. However, the second sheet may be narrower, thus not extending the entire length of the finished container. However, taking the most typical case utilizing the full width second sheet, the peripheral seals between the first and second sheets and the second and third sheets, respectively, are formed. These seals may be made in a typical known manner utilizing heat and pressure, the pressure perhaps approaching 500 psi, as stated earlier. Typically, the container is cut away from the supply material along the outer borders of the peripheral seals. This may be performed during the same step as forming the peripheral seals.

In the preferred embodiment, the peripheries of the sheets are sealed except for an opening into the storage compartment 48, the opening most likely being disposed at the container end where the sealed edge 88 is later formed. The opening is used to fill the storage compartment 48 with the liquid infant formula 40.

The finished container 20 is thus formed which, depending upon the respective materials and laminate structures of the first, second and third sheets, provides sterility, moisture and vapor barriers both between the storage and protection compartments 48, 50 and between the container and the environment. The container is thus capable of maintaining the formula 40 to the required degree of sterility.

When a container having two storage compartments is made, such as the container 156, one storage compartment is filled after the first seal line is made but before the second storage chamber seal line is made.

While several embodiments and features have been described in detail herein and shown in the accompanying drawings, it will be evident that various further modifications are possible without departing from the scope of the invention.

What is claimed is:

1. A nursing container comprising:
   (a) a first sheet;
   (b) a second, diaphragm sheet sealed about at least a portion of its peripehry to said first sheet and to a third sheet, said second, diaphragm sheet being intermediate said first sheet and said third sheet;
   (c) said first sheet and said third sheet sealed about their entire peripheries and forming the exterior wall of said container,
   (d) nipple means including a base and a nipple, between said first and second sheets, said first and second sheets being secured to the periphery of said base at a base seal;
   (e) said sheets defining a storage chamber on the base-side of said nipple means for storage of a substance to be delivered through said nipple;
   (f) said sheets extending beyond said base seal, on the nipple-side of said nipple means, opposite said storage chamber, said sheets being secured together on the nipple-side of said nipple means to define an enclosure chamber for said nipple means, there being no communication between said storage chamber and said enclosure chamber at said base seal, said enclosure chamber enclosing said nipple means on said nipple-side, segregating said nipple means from the environment;

(g) said enclosure chamber being further defined by a manually breakable line of securement between said first sheet and said second, diaphragm sheet to selectively separate said first and second sheets on said nipple-side to open said enclosure chamber, providing access to said nipple.

2. The nursing container as in claim 1, wherein said enclosure chamber breakable line of securement is a selectively openable seal line.

3. The nursing container as in claim 1, comprising a permanent line of securement further defining said enclosure chamber, disposed between said second and third sheets, and extending substantially parallel to, and substantially the length of, said enclosure chamber breakable line of securement.

4. The nursing container as in claim 2, comprising a permanent line of securement further defining said enclosure chamber, disposed between said second and third sheets, and extending substantially parallel to, and substantially the length of, said enclosure chamber breakable line of securement.

5. The nursing container of claim 1 in which said second, diaphragm sheet is sealed to said first sheet at a first location and is sealed to said third sheet at a second location spaced from the first location, said manually breakable line of securement being positioned in said second sheet adjacent to said first location.

6. The nursing container of claim 5 in which said second, diaphragm sheet is sealed to said first sheet at a third location and is sealed to said third sheet at a fourth location spaced from the third location, and a second, manually breakable line of securement is positioned in said second sheet adjacent one of said third and fourth locations, said first and second locations being on one side of the nipple means and the third and fourth locations being on the other side of said nipple means.

7. A container for a substance, comprising:
(a) a first sheet;
(b) a second, diaphragm sheet sealed about at least a portion of its periphery to said first sheet and to a third sheet, said second, diaphragm sheet being intermediate said first sheet and said third sheet;
(c) said first sheet and said third sheet sealed about their entire peripheries and forming the exterior wall of said container;
(d) access means including a base and a dispensing member, between said first and second sheets, said first and second sheets being secured to the periphery of said base at a base seal;
(e) said sheets defining a storage chamber on the base-side of said access means for storage of a substance to be delivered through said dispensing member;
(f) said sheets extending beyond said base seal, on the dispensing member-side of said access means, opposite said storage chamber, said sheets being secured together on the dispensing member-side of said access means to define an enclosure chamber for said access means, there being no communication between said storage chamber and said enclosure chamber at said base seal, said enclosure chamber enclosing said access means on said dispensing member-side, segregating said access means from the environment;
(g) said enclosure chamber being further defined by a manually breakable line of securement between said first sheet and said second, diaphragm sheet to selectively separate said first and second sheets on said dispensing member-side to open said enclosure chamber, providing access to said dispensing member.

8. The container as in claim 7, wherein said enclosure chamber breakable line of securement is a selectively openable seal line.

9. The container as in claim 7, comprising a permanent line of securement further defining said enclosure chamber, disposed between said second and third sheets, and extending substantially parallel to, and substantially the length of, said enclosure chamber breakable line of securement.

10. The container as in claim 8, comprising a permanent line of securement further defining said enclosure chamber, disposed between said second and third sheets, and extending substantially breakable line of securement.

11. The container of claim 7 in which said second, diaphragm sheet is sealed to said first sheet at a first location and is sealed to said third sheet at a second location spaced from the first location, said manually breakable line of securement being positioned in said second sheet adjacent to said first location.

12. The container of claim 11 in which said second, diaphragm sheet is sealed to said first sheet at a third location and is sealed to said third sheet at a fourth location spaced from the third location, and a second, manually breakable line of securement is positioned in said second sheet adjacent one of said third and fourth locations, said first and second locations being on one side of the access means and the third and fourth locations being on the other side of said access means.

* * * * *